W. TUCKER.
Machine for Turning Pattern-Cams.
No. 160,366. Patented March 2, 1875.
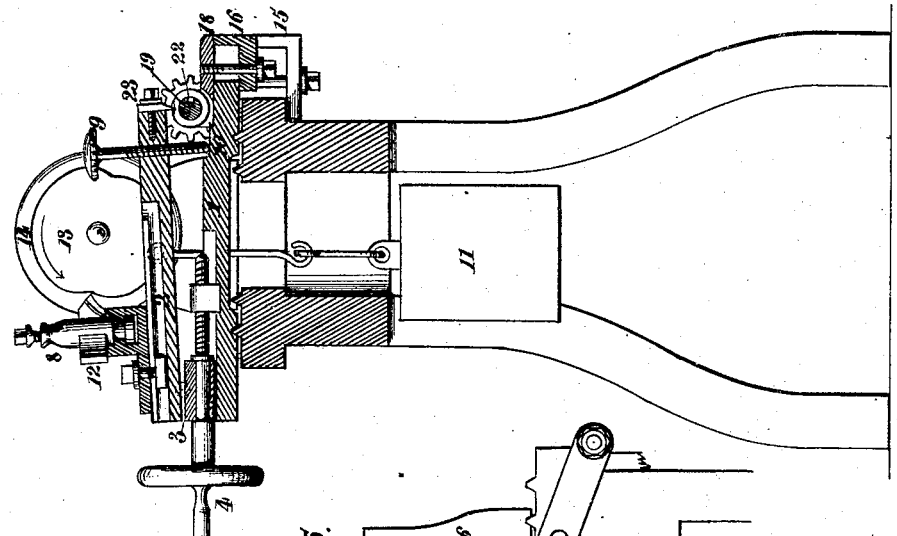
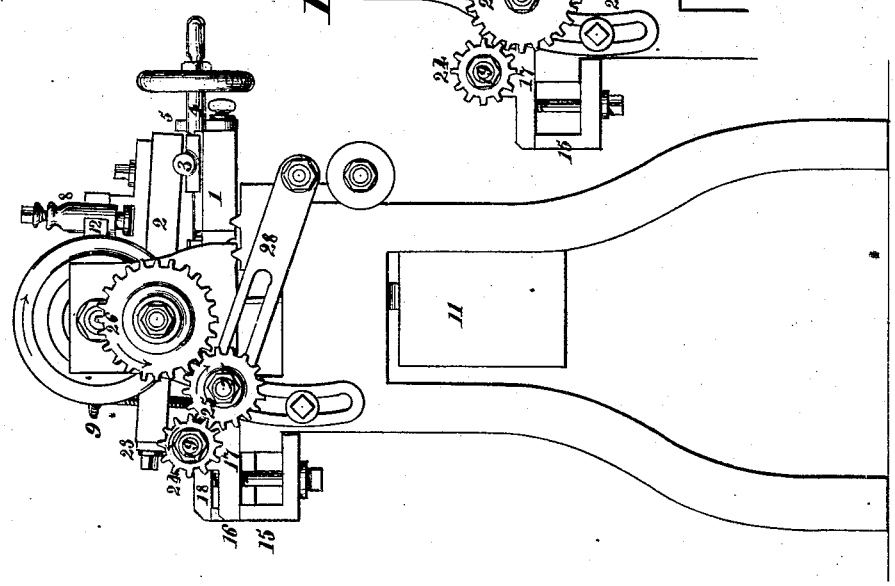
WITNESSES
Jas L. Ewin
Walter Allen
INVENTOR
William Tucker
By Knight Bros, Attorneys

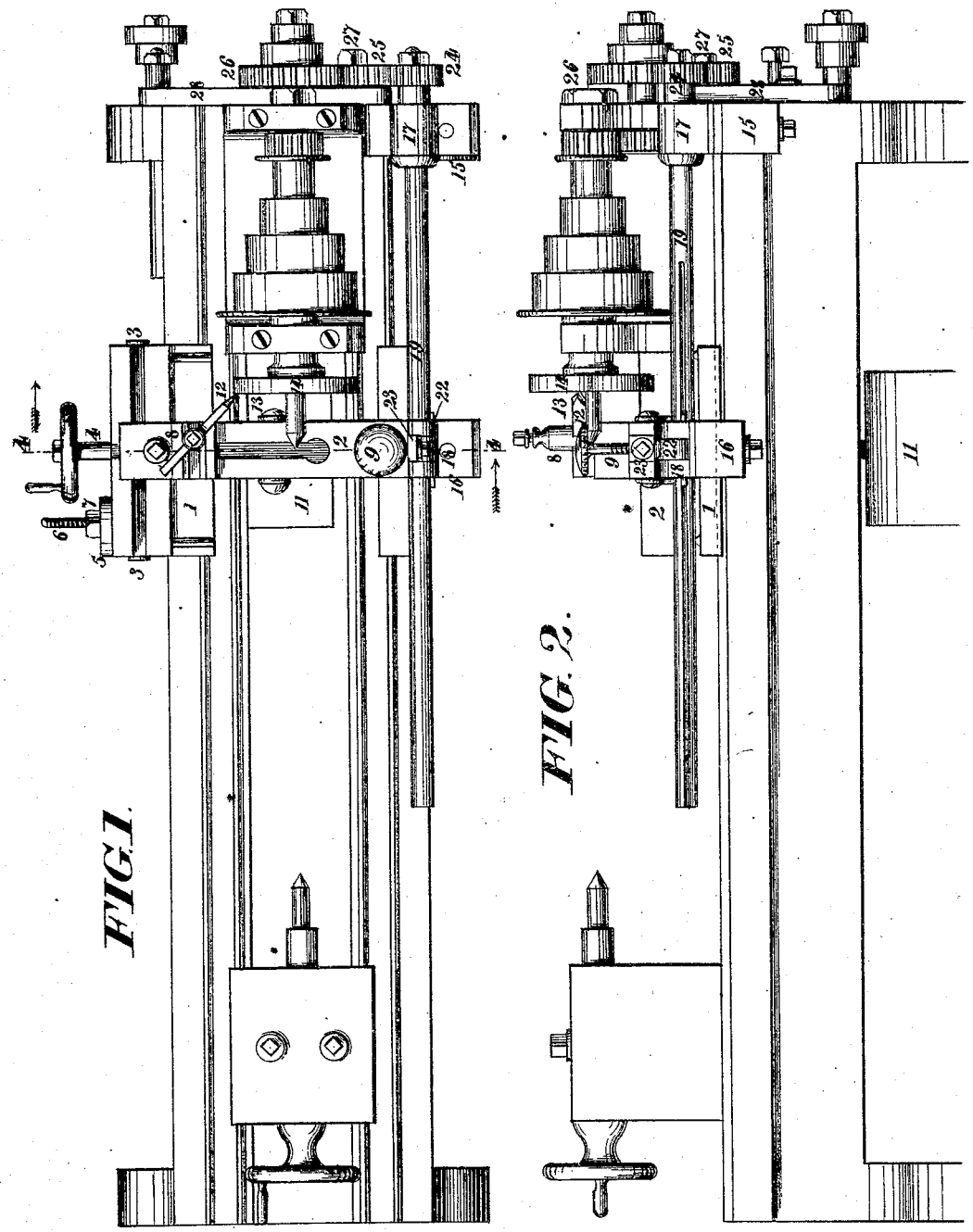

UNITED STATES PATENT OFFICE.

WILLIAM TUCKER, OF FISKEDALE, MASSACHUSETTS.

IMPROVEMENT IN MACHINES FOR TURNING PATTERN-CAMS.

Specification forming part of Letters Patent No. 160,366, dated March 2, 1875; application filed November 21, 1874.

*To all whom it may concern:*

Be it known that I, WILLIAM TUCKER, of Fiskedale, in the county of Worcester and State of Massachusetts, have invented a new and useful Improvement in the Manufacture of Pattern-Cams and Apparatus therefor, of which the following is a specification:

This invention relates primarily to a mode of producing multi-similar depressions or forms on the periphery of the face-plate of a common engine-lathe, to adapt such lathe for the manufacture of relieved taps, fluted reamers, and other similar articles.

The invention relates, further, to simple and efficient means for effecting the production of pattern-cams by this improved mode, and is applicable wholly or in part to the manufacture of pattern-cams generally.

The first part of the present invention consists in producing a pattern-cam having two or more depressions or forms, which require to be of precisely similar shape, and perfectly equidistant, by rotating the blank cam at proper speed, and turning or cutting the same by a tool manipulated mechanically by means of a rotary cam having a single depression or form of the required shape or depth, and driven at such relative speed as to produce one or more depressions or forms on the pattern-cam at each cut, the same to be multiplied and spaced as required with mechanical accuracy by shifting the gearing so as to adjust the generating-cam relatively to the work.

The second part of the invention consists in certain apparatus for carrying out this process, and in forming the same by simple attachments to an engine-lathe having a weighted tool-carriage, so that a pattern-cam having the required number of multi-similar depressions or forms can be readily produced on the periphery of the face-plate of such lathe by means of the lathe-tool, manipulated by a generating-cam which is driven from the lathe-spindle at proper relative speed.

The principal attachment is removable from the lathe to clear the latter for ordinary work, and is adapted for employment in combination with other parts to transmit motion from the pattern-cam to the tool-carriage for cutting relieved taps, fluted reamers, and other similar articles on the same lathe, as hereinafter set forth.

In the accompanying drawing, Figure 1 is a plan view of a weighted engine-lathe having attachments applied thereto, and adjusted as for cutting a pattern-cam on the periphery of the face-plate in accordance with the present invention. Fig. 2 is a side elevation of the same. Fig. 3 is an end elevation. Fig. 4 is a vertical transverse section on the line 4 4, Fig. 1. Fig. 5 is a partial end elevation, illustrating the employment of a different combination of gearing from that shown in the other figures.

The drawing represents a weighted engine-lathe of ordinary construction, with the attachments which constitute the subject-matter in part of the present invention applied thereto.

The feed-rod and lathe-screw are not extended to the tool-carriage in the illustration, because nothing peculiar to the present invention is involved in this connection.

The weighted tool-carriage, which coacts in peculiar manner with the attachments, consists of upper and lower members, 1 2, united at the front of the lathe by a horizontal pivot or hinge-joint, 3, and united further by a horizontal feed-screw, 4, applied by means of collars to the lower member of the hinge. The entire upper member of the carriage with the hinge is adapted to slide transversely of the lathe. A gage composed of a hook-stop, 5, a stud-screw, 6, and an adjusting-nut, 7, provides for limiting the advancement of the tool horizontally by means of the feed-screw 4. A tool holder or rest, 8, is applied in a cruciform groove in the top of the rest, and is adjusted therein to suit work of different diameters. A vertical regulating-screw, 9, provides, in the present uses of the lathe, for feeding the tool during the cutting operation. A seat or step, 10, for this screw is provided on the lower member of the carriage. The weight 11 is connected centrally by links to the upper member of the tool-carriage, and operates directly to draw the same downward, so as to hold the tool 12 against the work, and the regulating-screw 9 against its seat or support. The tool 12 is, by preference, of peculiar shape, as illustrated, having its effective point formed by a square or nearly square bevel at top, with a curved lower edge beveled on both sides. This form of tool is peculiarly designed for cutting or threading screw-taps, but is adapted also for employment in the present process of producing pattern-cams. The lathe-spindle is provided with an ordinary face-plate, 13, and the present invention relates primarily to means for producing a peculiar pattern-cam or forms, 14, on the periphery of the latter, to adapt it for employment in the manufacture of relieved taps, fluted reamers, and other similar articles, in the manner set forth in another specification, and the present invention is illustrated in the drawings as thus applied. A pair of clamps, 15 16, each tightened and secured by a single set-screw, serve to attach journal-boxes 17 18 to the lathe-bed, and to the rear end of the tool-carriage, respectively. These journal-boxes are in line horizontally, and receive a longitudinal shaft, 19, which is held against endwise motion by tight collars at the journal-box 17, while the journal-box 18 is adapted to slide thereon. The longitudinal shaft 19 is adapted by a groove to carry certain attachments thereto, and the journal-box 18 is recessed to receive these attachments. In the present use of the lathe and attachments, a generating-cam, 22, is thus applied. In lieu of this cam the longitudinal shaft is adapted to carry a transmitting-arm, to engage with the vertical feed-screw 9, in combination with a lever-arm clamped on the shaft in proper position to engage with the periphery of the face-plate. The principal attachment 15 16 17 18 19 with the lever-arm and transmitting-arm is the subject-matter in part of the allied invention hereinbefore referred to.

The generating-cam 22 is constructed with a single depression or form of a given shape, and a treadle-edge, 23, is attached by a set-screw to the rear end of the upper member of the tool-carriage, to engage with this cam. The shaft 19, as thus employed, is adapted to rotate, and is provided at the head of the lathe with a tight gear or pinion, 24, for the reception of which it is adapted by a shouldered and threaded extension furnished with a clamping-nut or its equivalent. An intermediate or idle wheel, 25, meshes with the pinion 24, and with a rotary spur-wheel, 26, on the counter-spindle, by which the feed-screw is driven, and which rotates at the same speed as the main spindle, being geared thereto as shown in Fig. 2. The intermediate gear 25 is mounted on an adjustable stud-shaft 27, in an ordinary jack-frame 28, and provision is thus and otherwise made for changing the gears, so as to vary the relative speed of the grooved shaft 19, which, through this connection, is rotated continuously in unison with the motion of the lathe-spindle. The rotations of the grooved shaft must be integral with the rotations of the spindle, as distinguished from fractional, so as to give the generating-cam or former 22 one or more rotations during each rotation of the piece or work, and by each rotation of the former one of the required depressions is produced in part at a certain point. If four depressions in the periphery of the face-plate be required the grooved shaft may be geared to make two rotations to one of the spindle, as illustrated in Figs. 1 and 4. The former will now impart its shape twice to the blank face-plate by the rise and fall of the tool twice during the rotation of the spindle; then by slipping off the gear 24 on the end of the grooved shaft, or dropping the idle-wheel 25 and giving the shaft 19 a quarter turn, and then bringing the gears into mesh again, two more depressions may be cut in the face-plate between those previously cut, so as to produce the required four depressions, all equally distant from each other and identical in form, since generated by one and the same form or pattern cam. By this means perfection in the pattern-cam on the face-plate is secured with great expedition in obtaining or producing any form or pattern, and any number of the same on the same periphery.

Fig. 5 illustrates the employment of a different combination of gearing, by which a single rotation is imparted to the generating-cam 22 during each rotation of the face-plate or work. In this case the wheels 24 and 26 are of equal diameter and have the same number of teeth; whereas in the first illustration the driving-wheel 26 is double the diameter of the wheel 24, and has twice its number of teeth. In this illustration the intermediate or idle wheel is changed also, that which was employed as the driving-wheel in the first arrangement being employed as the transmitting or idle wheel in the second. In some cases this change may not be necessary. In the employment of the second arrangement of gearing only one depression or form is produced at each rotation of the work, and the gearing requires, consequently to be shifted as many times during the operation as there are forms or depressions in the final product.

Instead of feeding the tool by the ordinary horizontal feed-screw 4, it is fed vertically, or nearly vertically, in manner as follows: The tool is first set by bringing the stock 8 to such a position on the carriage, as that, on raising or falling the vertical screw 9, the point of the tool will cut the axis of the lathe centers, or as nearly to this position as the diameter of the face-plate will permit. The check-nut 7 on the gage-screw 6 is then set so that the tool may be drawn backward, but not advanced, farther by the horizontal feed-screw, 4, and the tool is then elevated by means of the vertical screw 9, so as to admit the face-plate beneath it. This last-named screw now becomes the feed-screw, by turning which the tool is dropped upon the work, and the cutting is done as nearly as possible on the top of the piece, instead of on a line passing horizontally through its center. While the lathe is running back after each cut, feed is given for the subsequent cut by the requisite turns of the vertical screw.

After a perfect face-plate of the desired form is thus obtained, the lathe and attachments are readily shifted to a condition for cutting taps, &c., by means of the combined face-plate and pattern-cam with the principal attachment and special auxiliaries hereinbefore described and referred to, as more fully set forth in another specification.

The process and apparatus above described may obviously be embodied in an independent machine, if preferred, instead of in an engine-lathe and attachments thereto, and may be employed for the production of pattern-cams for use for other purposes, as well as for the production of different patterns on one and the same face-plate. The apparatus may also be modified in many unessential details.

The following is claimed as new in this invention, namely:

1. As an improvement in the art of making pattern-cams, the process of producing a series of uniform depressions or forms by operating the cutting-tool mechanically through the medium of a rotary cam, 22, having a single depression or form of the required shape or depth, substantially as herein described.

2. The combination of the rotary shaft 19, the generating-cam 22 thereon, constructed with a single depression or form of a given shape or depth, the treadle-edge 23, and the vertical feed-screw 9, with a weighted tool-carriage or its equivalent, for manipulating a cutting-tool, 12, in the manner herein set forth.

3. The combination, in an engine-lathe, of a weighted tool-carriage, provided with a treadle-edge, 23, at the rear end of its upper member, a generating-cam, 22, supported at the rear end of its lower member by a recessed journal-box, 18, a shaft, 19, supported against longitudinal displacement, and on which the generating-cam 22 and journal-box 18 are adapted to slide, and gearing 24 25 26 for rotating the shaft and generating cam in unison with the lathe-spindle, substantially as herein shown and described, as means for cutting a pattern-cam on the periphery of the face-plate by means of the lathe-tool, in the manner set forth.

WILLIAM TUCKER.

Witnesses:
EMORY L. BATES,
THOMAS R. PHETTEPLACE.